(12) United States Patent
Massoud et al.

(10) Patent No.: US 11,264,835 B2
(45) Date of Patent: Mar. 1, 2022

(54) INDUCTIVE-CAPACITIVE NETWORK CIRCUIT FOR CAPACITIVE POWER TRANSFER

(71) Applicant: QATAR UNIVERSITY, Doha (QA)

(72) Inventors: Ahmed Massoud, Doha (QA); Asmaa Elekhtiar, Doha (QA); Lobna Eltagy, Doha (QA); Tassneem Zamzam, Doha (QA); Ahmed Abbas Elserogi, Doha (QA); Shehab Ahmed, Doha (QA)

(73) Assignee: QATAR UNIVERSITY, Doha (QA)

( * ) Notice: Subject to any disclaimer, the term of this patent is extended or adjusted under 35 U.S.C. 154(b) by 218 days.

(21) Appl. No.: 16/413,236

(22) Filed: May 15, 2019

(65) Prior Publication Data

US 2020/0366128 A1    Nov. 19, 2020

(51) Int. Cl.
*H02J 50/10*    (2016.01)
*H02J 50/05*    (2016.01)

(52) U.S. Cl.
CPC ............. *H02J 50/10* (2016.02); *H02J 50/05* (2016.02)

(58) Field of Classification Search
CPC .................................................... H02J 50/05
See application file for complete search history.

(56) References Cited

U.S. PATENT DOCUMENTS

| | | | |
|---|---|---|---|
| 9,554,411 B1* | 1/2017 | Hall | H02J 50/20 |
| 2014/0175868 A1* | 6/2014 | Sakakibara | H02J 50/27 |
| | | | 307/9.1 |
| 2020/0287413 A1* | 9/2020 | Peretz | H02J 50/90 |

OTHER PUBLICATIONS

Wikipedia contributors. "Series and parallel circuits." Wikipedia, The Free Encyclopedia. Wikipedia, The Free Encyclopedia, Jun. 14, 2021. Web. Jun. 29, 2021. (Year: 2021).*

Wikipedia contributors. "Node (circuits)." Wikipedia, The Free Encyclopedia. Wikipedia, The Free Encyclopedia, Sep. 29, 2020. Web. Sep. 30, 2021. (Year: 2021).*

Jiejian Dai et al., "Single Active Switch Power Electronics for Kilowatt Scale Capacitive Power Transfer", IEEE Journal of Emerging and Selected Topics in Power Electronics, vol. 3, No. 1, Mar. 2015, 9 pages, http://ieeexplore.ieee.org. DOI: 10.1109/JESTPE.2014.2334621.

(Continued)

*Primary Examiner* — Daniel Cavallari
(74) *Attorney, Agent, or Firm* — Squire Patton Boggs (US) LLP

(57) ABSTRACT

Systems, methods, apparatuses, and computer program products for drone based network optimization are provided. An inductive-capacitive circuit may include a first branch including a first energy storage element. The inductive-capacitive circuit may also include a second branch including a second energy storage element and a third energy storage element. In addition, the inductive-capacitive circuit may include a third branch including a fourth energy storage element and a fifth energy storage element, and a power source supplying a current through the first branch, the second branch, and the third branch. Further, the first branch, the second branch, and the third branch may be connected to at least one common node of the inductive-capacitive circuit.

9 Claims, 11 Drawing Sheets

(56) References Cited

OTHER PUBLICATIONS

Jiejian Dai et al., "Capacitive Power Transfer Through a Conformal Bumper for Electric Vehicle Charging", IEEE Journal of emerging and Selected Topics in Power Electronics, vol. 4, No. 3, Sep. 2016, 11 pages, http://ieeexplore.ieee.org. DOI: 10.1109/JESTPE.2015.2505622.

Liang Huang et al., "Comparison of Two High Frequency Converters for Capacitive Power Transfer", 7 pages, 978-1-4799-5776-7/14, 2014 IEEE ECCE.

Chao Liu et al., "Comparative Study of CCPT Systems With Two Different Inductor Tuning Positions", IEEE Transactions on Power Electronics vol. 27, No. 1, Jan. 2012, 13 pages, http://ieeexplore.ieee.org, DOI: 10.1109/TPEL.2011.2158322.

Fei Lu et al., "A Double-Sided LCLC-Compensated Capacitive Power Transfer System for Electric Vehicle Charging", IEEE Transaction on Power Electronics, vol. 30, No. 11, Nov. 2015, 4 pages, http://ieeexplore.ieee.org, DOI: 10.1109/TPEL.2015.2446891.

\* cited by examiner

INDUCTIVE-CAPACITIVE NETWORK CIRCUIT FOR CAPACITIVE POWER TRANSFER

FIELD OF THE INVENTION

Certain embodiments may generally relate to inductive-capacitive networks. For example, certain embodiments may be directed to a T-shaped inductive-capacitive network circuit for capacitive power transfer operations with enhanced power capability.

BACKGROUND OF THE INVENTION

Capacitive power transfer (CPT) has been proposed for various applications including, for example, electric vehicle charging applications. In CPT, there is generally no direct contact between the source and load plates, where the power is transferred through the electric field of the involved coupling capacitors, as illustrated in FIG. 1. As also illustrated in FIG. 1, the circuit may be fed from a conventional two-level single-phase voltage source inverter, where it can be controlled to generate AC voltage with a desired frequency (f).

A drawback of CPT is that the coupling capacitance is in the range of nF (for short separating distances) or pF (for relatively long distances). Therefore, with AC sources of low frequency, the capacitive reactance of the coupling capacitors becomes high, and the load voltage is correspondingly insignificant.

Further, as illustrated in FIG. 2 of a conventional method to compensate the effect of the coupling capacitor in CPT, external inductors may be connected in series with the coupling capacitances (series compensation). The inductive value may be selected such that it resonates with the capacitance at the fundamental frequency (f). In the method illustrated in FIG. 2, the maximum load power that can be extracted depends on the value of Equivalent Series Resistance (ESR) of the employed inductors (r), where in case of resistive load, the maximum power condition occurs when the load resistance equals (2r). The amount of maximum power equals $(V^2/2r)$, where V is the root mean square value of the AC source voltage. In view of the drawbacks described above, there is a need, therefore, to provide an inductive-capacitive network for CPT applications with enhanced power capability.

SUMMARY OF THE INVENTION

One embodiment may be directed to an inductive-capacitive circuit. The inductive-capacitive circuit may include a first branch including a first energy storage element. The inductive-capacitive circuit may also include a second branch including a second energy storage element and a third energy storage element. In addition, the inductive-capacitive circuit may include a third branch including a fourth energy storage element and a fifth energy storage element, and a power source supplying a current through the first branch, the second branch, and the third branch. Further, the first branch, the second branch, and the third branch may be connected to at least one common node of the inductive-capacitive circuit.

Another embodiment may be directed to a capacitive power transfer system. The capacitive power transfer system may include an inductive-capacitive circuit. The capacitive power transfer system may also include a direct current power source supplying direct current to the inductive-capacitive circuit. In addition, the capacitive power transfer system may include a power inverter configured to change the direct current to an alternating current, and a resistor load component electrically coupled to the inductive-capacitive circuit. Further, the capacitive power transfer system may include a signal monitoring device configured to monitor signal voltages in the inductive-capacitive circuit, and a client computing device configured to implement a program to drive the system. The inductive-capacitive circuit may include a first branch including a first energy storage element, a second branch including a second energy storage element and a third energy storage element, a third branch including a fourth energy storage element and a fifth energy storage element, and a power source supplying a current through the first branch, the second branch, and the third branch. Further, the first branch, the second branch, and the third branch may be connected to at least one common node of the inductive-capacitive circuit.

Another example embodiment may be directed to a computer program, embodied on a non-transitory computer readable medium. The computer program, when executed by a processor, may cause the processor to drive a system that includes an inductive-capacitive circuit. The apparatus may also be caused to supply a direct current to an inductive-capacitive circuit. The apparatus may further be caused to change the direct current to an alternating current. In addition, the apparatus may be caused to monitor signal voltages in the inductive-capacitive circuit. Further, the inductive-capacitive circuit may include a first branch including a first energy storage element, a second branch including a second energy storage element and a third energy storage element, a third branch including a fourth energy storage element and a fifth energy storage element, and a power source supplying a current through the first branch, the second branch, and the third branch. In addition, the first branch, the second branch, and the third branch may be connected to at least one common node of the inductive-capacitive circuit.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION

Figure 1:
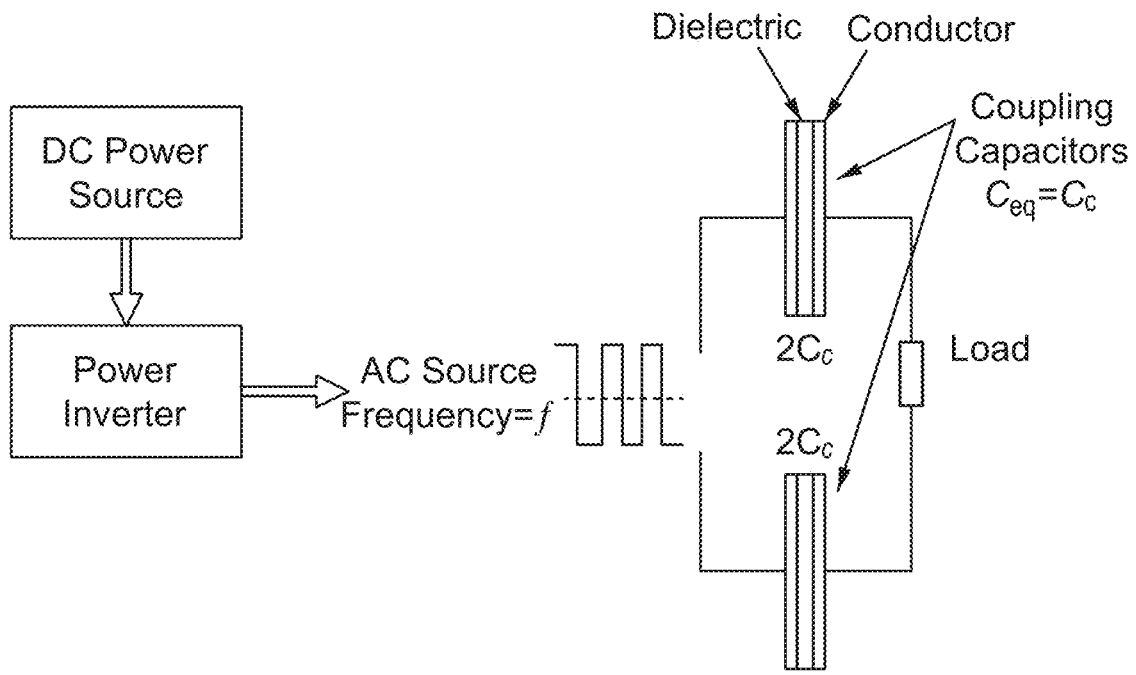
FIG. 1 illustrates a conventional capacitive power transfer (CPT) circuit.
Figure 2:
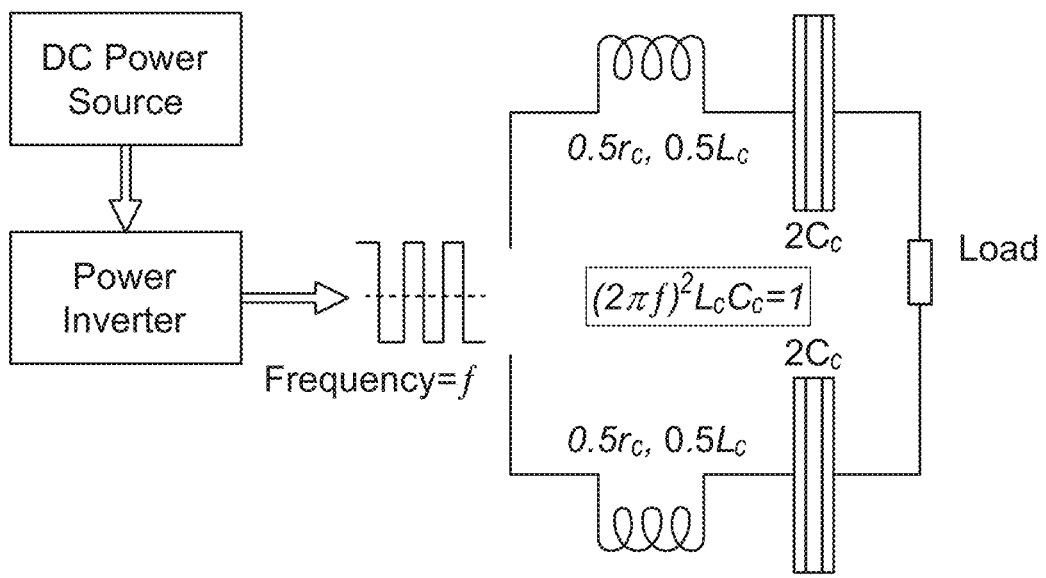
FIG. 2 illustrates a conventional method to compensate the effect of a coupling capacitor in CPT.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention.

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical or structural changes may be made to the invention without departing from the spirit or scope of this disclosure. To avoid detail not necessary to enable those skilled in the art to practice the embodiments described herein, the description may omit certain information known to those skilled in the art. The following detailed description is, therefore, not to be taken in a limiting sense.

Certain embodiments are described herein for using various tools and procedures used by a software application for operating an inductive-capacitive network for capacitive power transfer (CPT) applications with enhanced power capability. The examples described herein are for illustrative purposes only. As will be appreciated by one skilled in the art, certain embodiments described herein, including, for example, but not limited to, those shown in FIGS. 3 and 6-12 embodied as a system, apparatus, method, and/or computer program product. Accordingly, certain embodiments may take the form of an entirely software embodiment or an embodiment combining software and hardware aspects. Software may include but is not limited to firmware, resident software, microcode, etc. Furthermore, other embodiments can take the form of a computer program product accessible from a computer-usable or computer-readable medium providing program code for use by or in connection with a computer or any instruction execution system.

As will be described herein, any combination of one or more computer usable or computer readable medium(s) may be utilized with certain embodiments. For the purposes of this description, a computer-usable or computer readable medium can be any apparatus that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium, More specific examples (a non-exhaustive list) of the computer-readable medium may independently be any suitable storage device, such as a non-transitory computer-readable medium. Suitable types of memory may include, but not limited to: a portable computer diskette; a hard disk drive (HDD), a random access memory (RAM), a read-only memory (ROM); an erasable programmable read-only memory (EPROM or Flash memory); a portable compact disc read-only memory (CDROM); and/or an optical storage device.

The memory may be combined on a single integrated circuit as a processor, or may be separate therefrom. Furthermore, the computer program instructions stored in the memory may be processed by the processor can be any suitable form of computer program code, for example, a compiled or interpreted computer program written in any suitable programming language. The memory or data storage entity is typically internal, but may also be external or a combination thereof, such as in the case when additional memory capacity is obtained from a service provider. The memory may also be fixed or removable.

The computer usable program code (software) that may be implemented with certain embodiments may be transmitted using any appropriate transmission media via any conventional network. Further, computer program code, when executed in hardware, for carrying out operations of certain embodiments may be written in any combination of one or more programming languages, including, but not limited to, an object oriented programming language such as Java, Smalltalk, C++, C# or the like and conventional procedural programming languages, such as the "C" programming language or similar programming languages. Alternatively, certain embodiments may be performed entirely in hardware.

Depending upon the specific embodiment, the program code may be executed entirely on an electronic computer, a user's device, partly on the user's device, as a stand-alone software package, partly on the user's device and partly on a remote computer, or entirely on the remote computer or server. In the latter scenario, the remote computer may be connected to the user's device through any type of conventional network. This may include, for example, a local area network (LAN) or a wide area network (WAN), Bluetooth, Wi-Fi, satellite, or cellular network, or the connection may be made to an external computer (for example, through the Internet using an Internet Service Provider).

Certain embodiments may provide a T-shape inductive-capacitive network for CPT applications. According to certain embodiments, a passive network may provide operations with a boosted load voltage, lower voltage stresses of the passive network, and enhanced power capabilities with a moderate range of frequency (f). Further, in certain embodiments, the effect of inductor ESR may be insignificant on the value of load resistance at maximum power condition. As such, it may be possible to transfer higher power levels, for example, enhanced power capability when compared to the aforementioned conventional method.

Figure 3A:
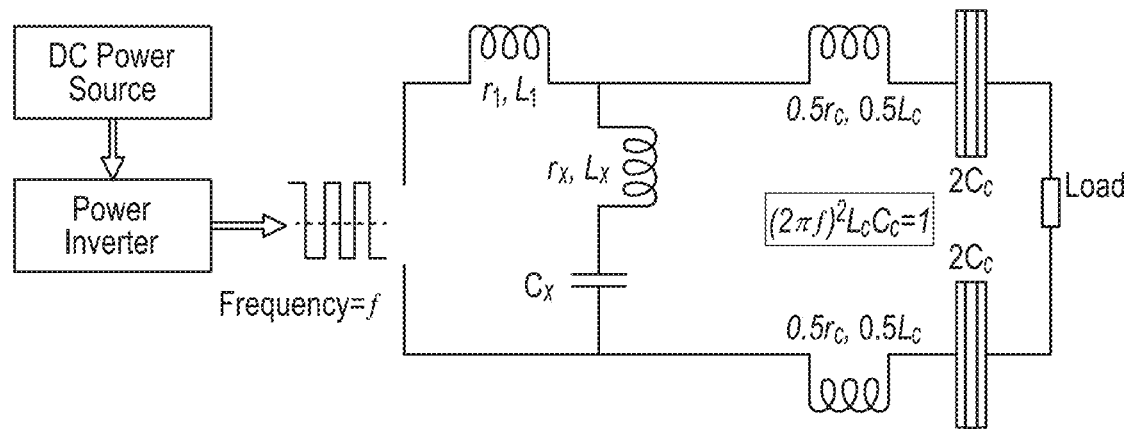
FIG. 3(a) illustrates an inductive-capacitive network circuit according to certain embodiments.

FIG. 3(a) illustrates an inductive-capacitive network circuit according to certain embodiments. In particular, FIG. 3(a) illustrates a circuit architecture that includes a series inductive branch ($L_1$ with ESR of $r_1$) and an LC shunt branch ($L_xC_x$) that are employed in addition to the inductors. The shunt branch in FIG. 3(a) may be tuned on the third harmonic (3f), and the inductance ($L_1$) may be selected to ensure that the gain is zero after the third harmonic component of the input AC voltage. Further, the capacitance $C_x$ in FIG. 3(a) may be selected such that the equivalent impedance seen by the source at the fundamental frequency is capacitive (i.e., leading power factor) to ensure operation with boosted load voltage.

Figure 3B:
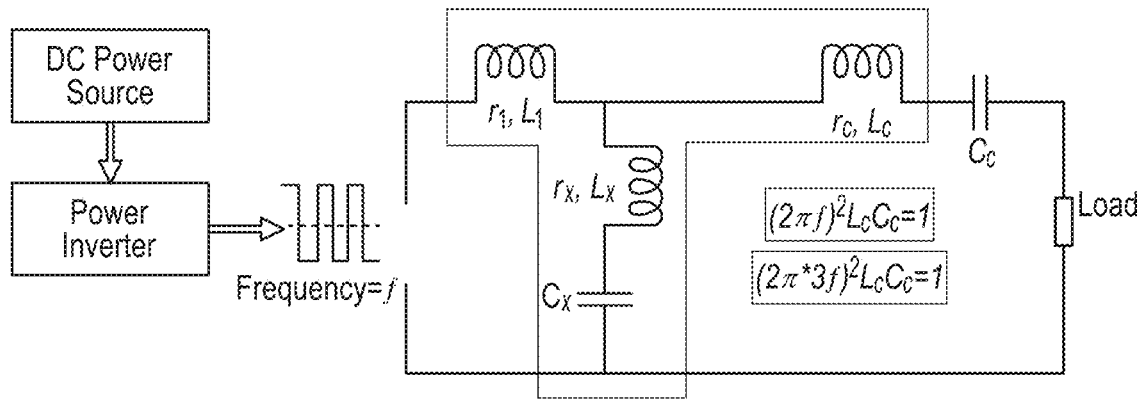
FIG. 3(b) illustrates another inductive-capacitive network circuit according to certain embodiments.

FIG. 3(b) illustrates another inductive-capacitive network circuit according to certain embodiments. In particular, FIG. 3(b) illustrates an equivalent circuit of that illustrated in FIG. 3(a). Further, in FIG. 3(b), a T-shape inductive-capacitive network for CPT is visible.

Figure 4:
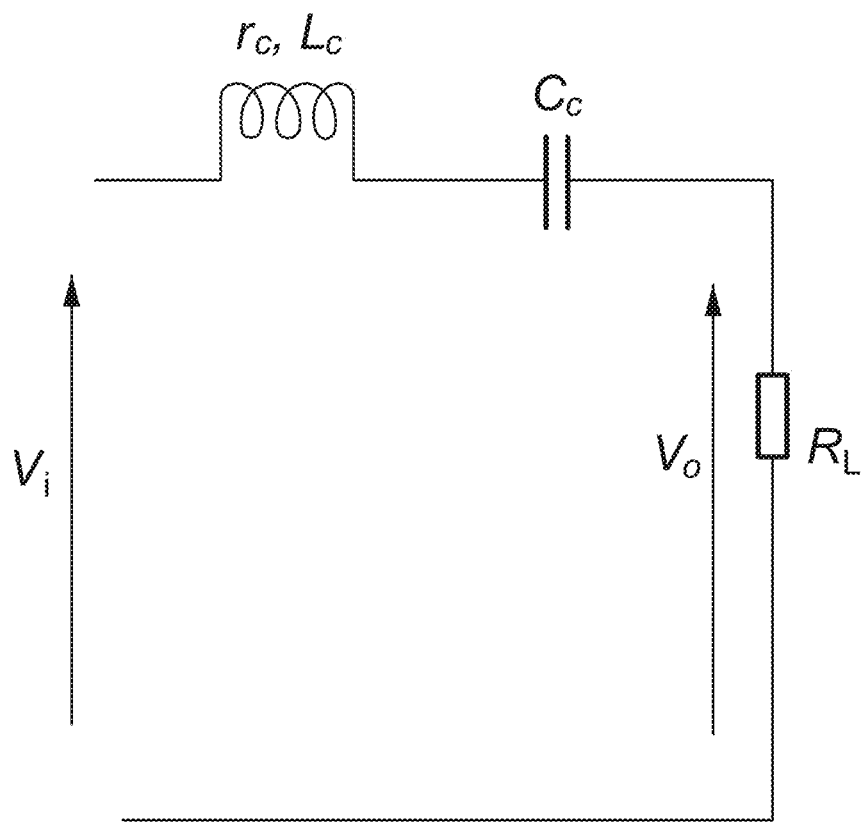
FIG. 4 illustrates a circuit of a conventional method of CPT.

FIG. 4 illustrates a circuit of a conventional method of CPT. With respect to FIG. 4, a corresponding transfer function may be given by:

$$\frac{v_o(s)}{v_i(s)} = \frac{R_L C_c s}{L_c C_c s^2 + (R_L + r_c)C_c s + 1} \quad (1)$$

For f=50 kHZ and $C_c$=3 nF, an equitant inductance $L_c$ of 3.38 mH may be needed to ensure a resonance at 50 kHz.

Figure 5:
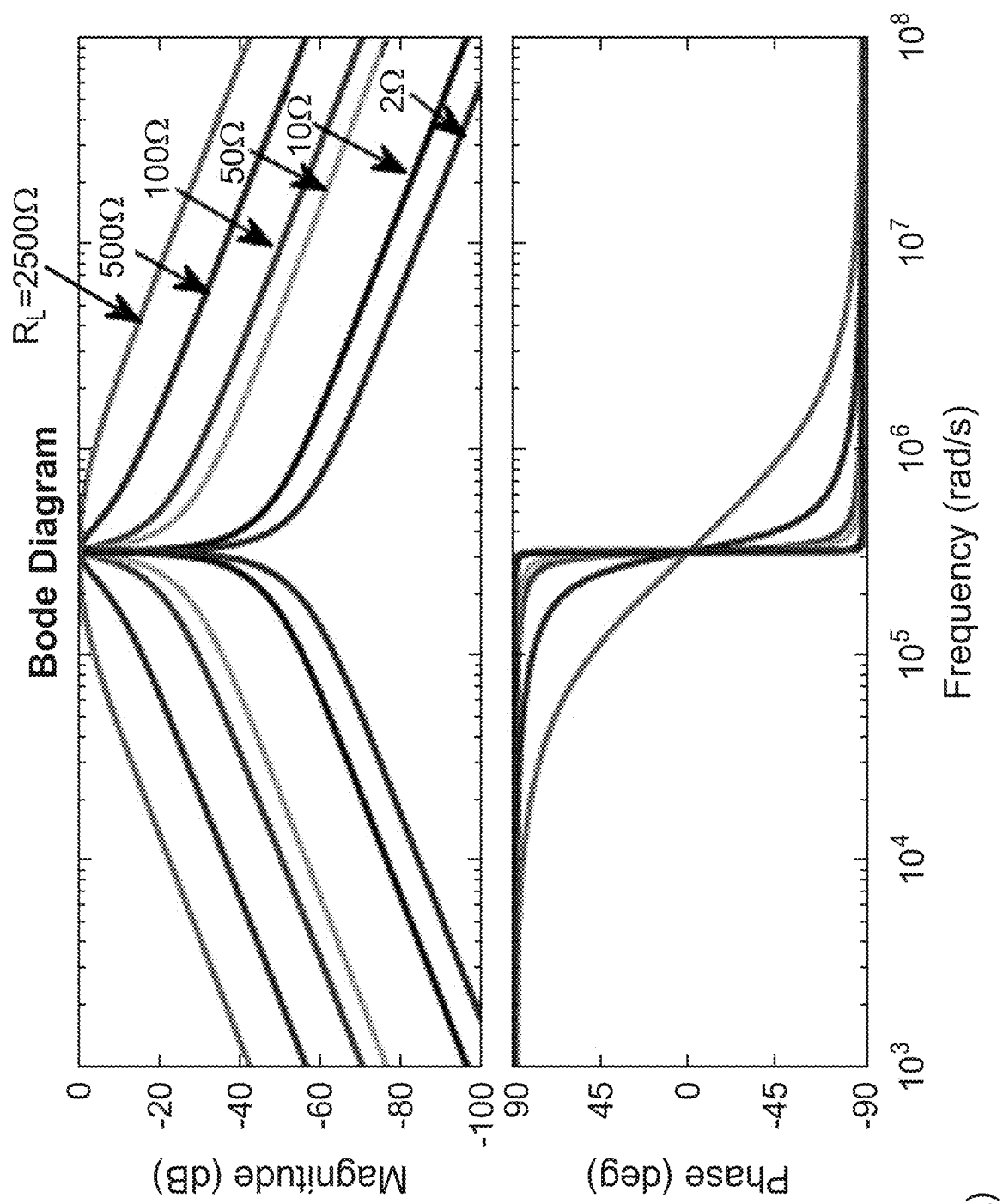
FIG. 5 illustrates a Bode plot of the conventional method for a given numerical example.

FIG. 5 illustrates a Bode plot of the conventional method for a given numerical example. In particular, FIG. 5 illustrates a corresponding Bode plot of the circuit illustrated in FIG. 4. According to the Bode plot in FIG. 5, it is assumed that $r_c$ is of 0.8 ohm. Based on FIG. 5, the gain is about 0 db (i.e., unity gain) in the open circuit condition, and becomes more in the negative db range (i.e., attenuation) with the decrease of the load resistance. As also illustrated in FIG. 5, the maximum power transfer condition occurs when the load resistance equals $r_c$. In other words, the maximum power transfer condition occurs when the load resistance is $R_L$=0.8 ohm.

Figure 6A:
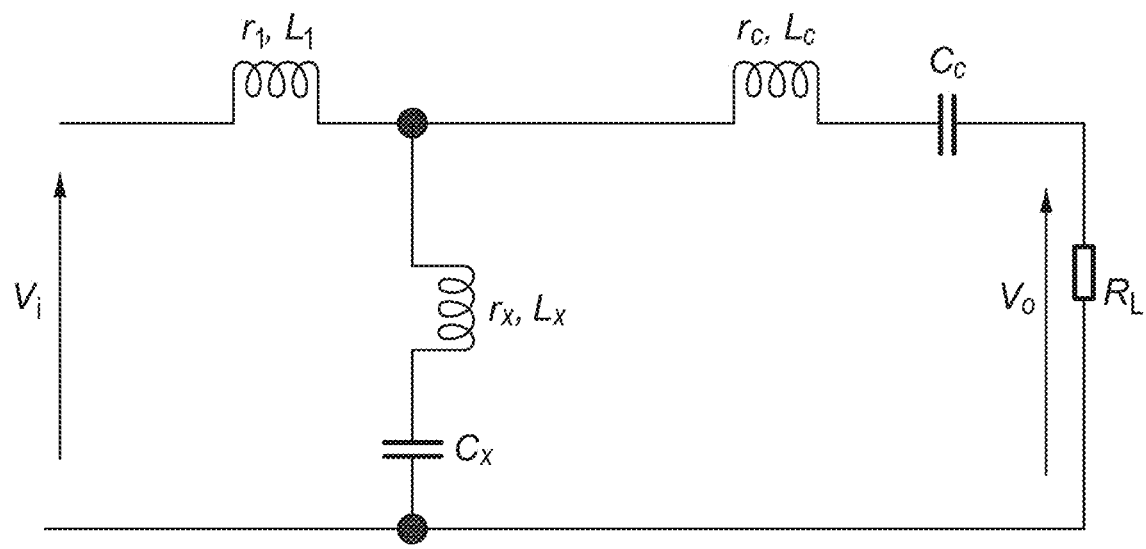
FIG. 6(a) illustrates an inductive-capacitive network circuit according to certain embodiments.
Figure 6B:
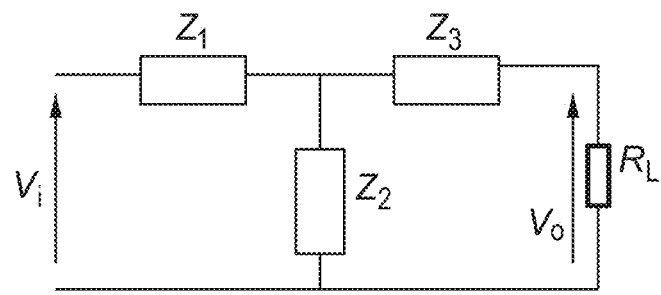
FIG. 6(b) illustrates an inductive-capacitive network circuit with impedances shown therein according to certain embodiments.
Figure 6C:
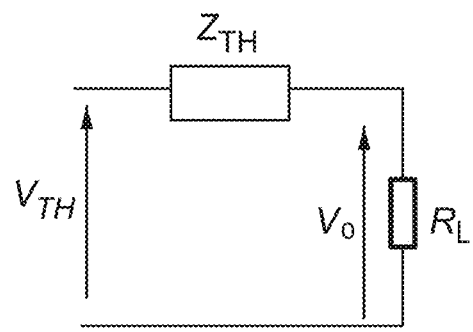
FIG. 6(c) illustrates an inductive-capacitive network circuit with Thevenin equivalent parameters shown therein according to certain embodiments.

FIG. 6(a) illustrates an inductive-capacitive network circuit according to certain embodiments, FIG. 6(b) illustrates an inductive-capacitive network circuit with impedances shown therein according to certain embodiments, and FIG. 6(c) illustrates an inductive-capacitive network circuit with Thevenin equivalent parameters shown therein according to certain embodiments. With regard to FIG. 6(b), the impedances may be given as:

$$Z_1 = r_1 + sL_1 \quad (2)$$

$$Z_2 = r_x + sL_x + \frac{1}{C_x s} \quad (3)$$

$$Z_3 = r_c + sL_c + \frac{1}{C_c s} \quad (4)$$

Further, with regard to FIG. 6(c), the Thevenin equivalent parameters shown therein may be given as:

$$Z_{TH} = Z_3 + \frac{Z_1 Z_2}{Z_1 + Z_2} \quad (5)$$

$$V_{TH} = \frac{v_i Z_2}{Z_1 + Z_2} \quad (6)$$

Based on FIG. 6(c), Eq. (5), and Eq. (6), the transfer function of the architecture according to certain embodiments may be given by:

$$\frac{v_o}{v_i} = \frac{Z_2 R_L}{(Z_3 Z_1 + Z_3 Z_2 + Z_1 Z_2) + R_L(Z_1 + Z_2)} \quad (7)$$

By simplifying the aforementioned transfer function with Eqs. (2)-(4), the following expression may be extracted:

$$\frac{v_o}{v_i} = \frac{Qs^2 + Ws^3 + Zs}{As^4 + Bs^3 + Cs^2 + Ds + E} \quad (8)$$

Where $$Q = R_L r_x,$$

$$W = R_L L_x,$$

$$Z = \frac{R_L}{C_X},$$

$$A = (L_c L_1 + L_c L_x + L_1 L_x)$$

$$B = (L_c r_1 + L_c r_x + r_1 L_x + L_1 r_x + L_1 R_L + L_x R_L + L_1 r_c + r_c L_x)$$

$$C = \left(\frac{L_1}{C_c} + \frac{L_c}{C_x} + \frac{L_x}{C_c} + r_1 r_x + \frac{L_1}{C_x} + R_L r_1 + r_x R_L + + r_c r_1 + r_c r_x\right)$$

$$D = \left(\frac{r_1}{C_c} + \frac{r_x}{C_c} + \frac{r_1}{C_x} + \frac{R_L}{C_x} + \frac{r_c}{C_x}\right),$$

$$E = \frac{1}{C_c C_x}$$

In certain embodiments, for f=50 kHz and $C_c$=3 nF (assuming almost a separating distance of 1 mm and a plate dimension of 50 cm×50 cm), an equitant inductance $L_c$ of 3.38 mH may be needed to ensure resonance condition at 50 kHz. Then for $C_x$=1 μF, an inductance $L_x$ of 1.126 μH may be needed to ensure a resonance condition in the shunt branch at 150 kHz.

Figure 7:
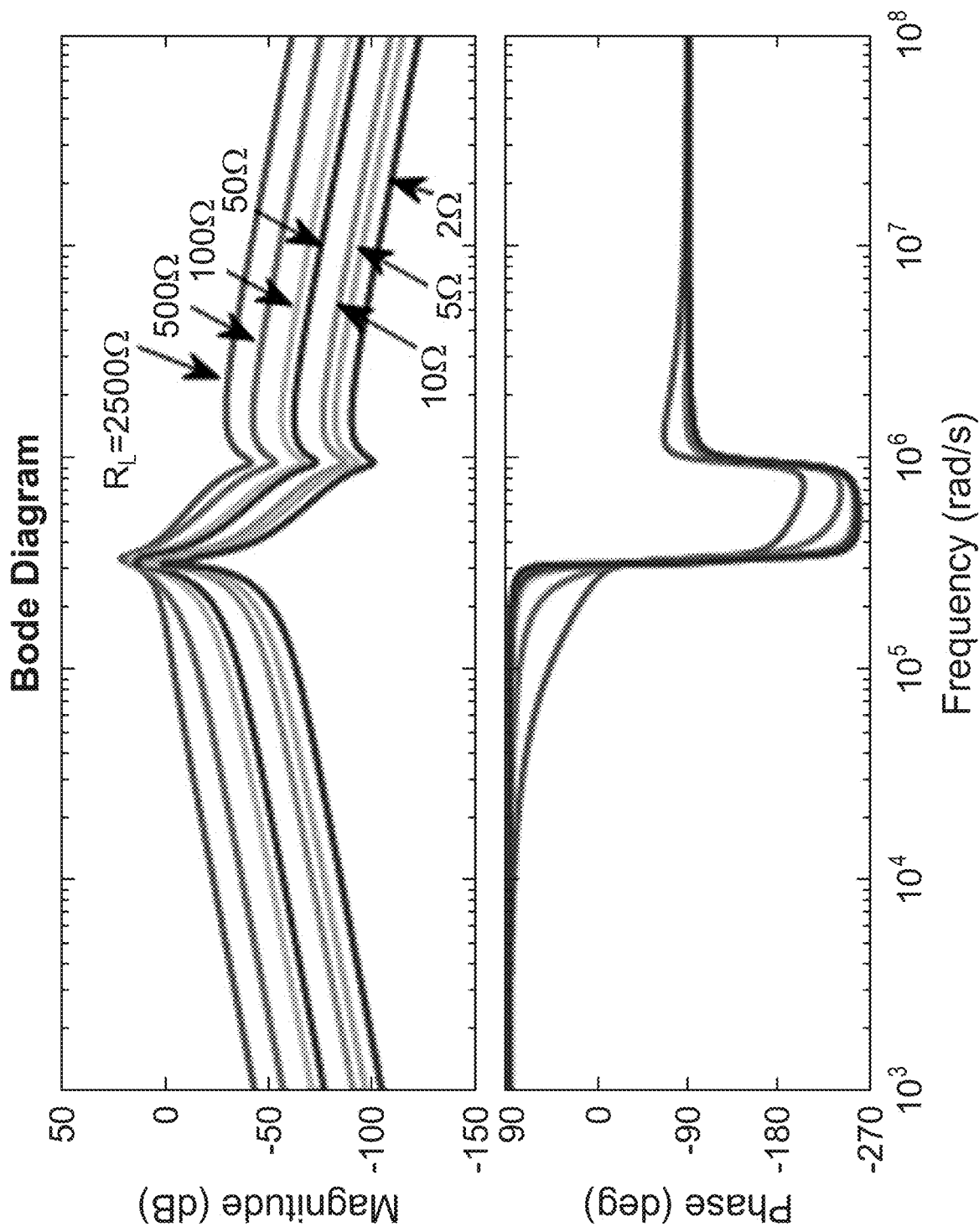
FIG. 7 illustrates a Bode plot of a method for a given numerical example according to certain embodiments.

FIG. 7 illustrates a Bode plot of a method for a given numerical example according to certain embodiments. In particular, FIG. 7 illustrates a corresponding Bode plot for $L_1$ of 8 μH, assuming an $r_c$ of 0.8 ohm, $r_x$=0.1 ohm, and $r_1$=0.1 ohm. According to certain embodiments, the maximum power condition may occur when the load resistance equals the magnitude of Thevenin impedance $|Z_{TH}|$, which may be extracted from Eq. (5), which is 20 ohm in the presented numerical example. Based on FIG. 7, the gain is within a positive db range (i.e., boosted AC voltage is applied across the load and enhanced load power).

According to certain embodiments, the extracted load powers versus gain for different values of load resistance may be presented, assuming an input AC voltage with a fundamental peak of 100V. The fundamental Mode analysis (FMA) may be considered as higher harmonics, and may be attenuated using the architecture of certain embodiments described herein with the proposed values.

Figure 8:
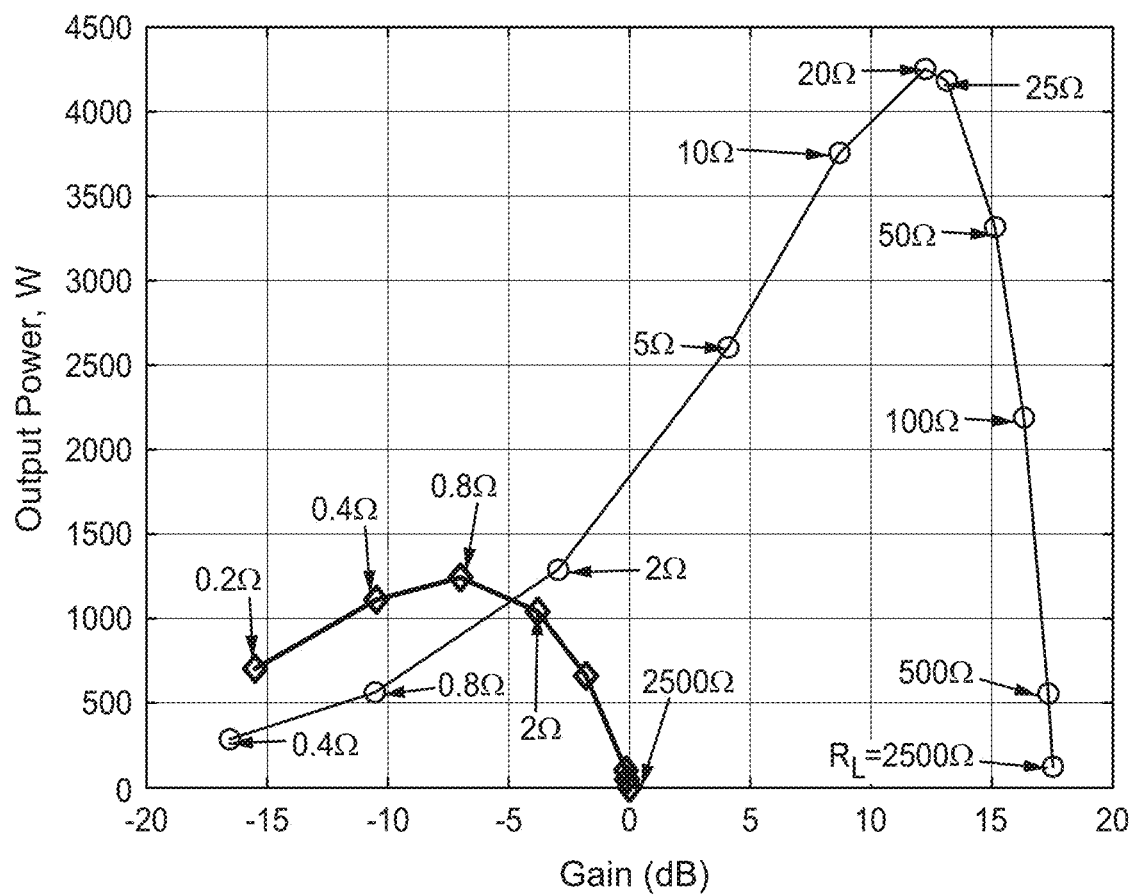
FIG. 8 illustrates a power vs. gain plot comparison of the architecture according to certain embodiments and that of the conventional method.

FIG. 8 illustrates a power vs. gain plot comparison of the architecture according to certain embodiments and that of the conventional method. As illustrated in FIG. 8, the system according to certain embodiments may be operated with a T-shape filter dispensing with the inductor (Lx), yet the interpolated curve may be obtained between the two curves presented in FIG. 8. Based on the results illustrated in FIG. 8, the conventional method does not have any boosting capability. Moreover, in the conventional method, the load power increases with a decrease of the load resistor until it reaches the value at which the maximum power condition is achieved (i.e., $R_L=r_C$), then increasing the load resistance decreases the load power.

In contrast, as illustrated in FIG. 8, the architecture according to certain embodiments provides boosted AC load voltage/enhanced load power. Further, the maximum load power occurs at $R_L=|Z_{TH}|=20$ ohm, which, in other words, is the value of load resistance at which maximum power condition is achieved depending on the values of employed passive components, where the effect of $r_c$ is negligible.

Figure 9:
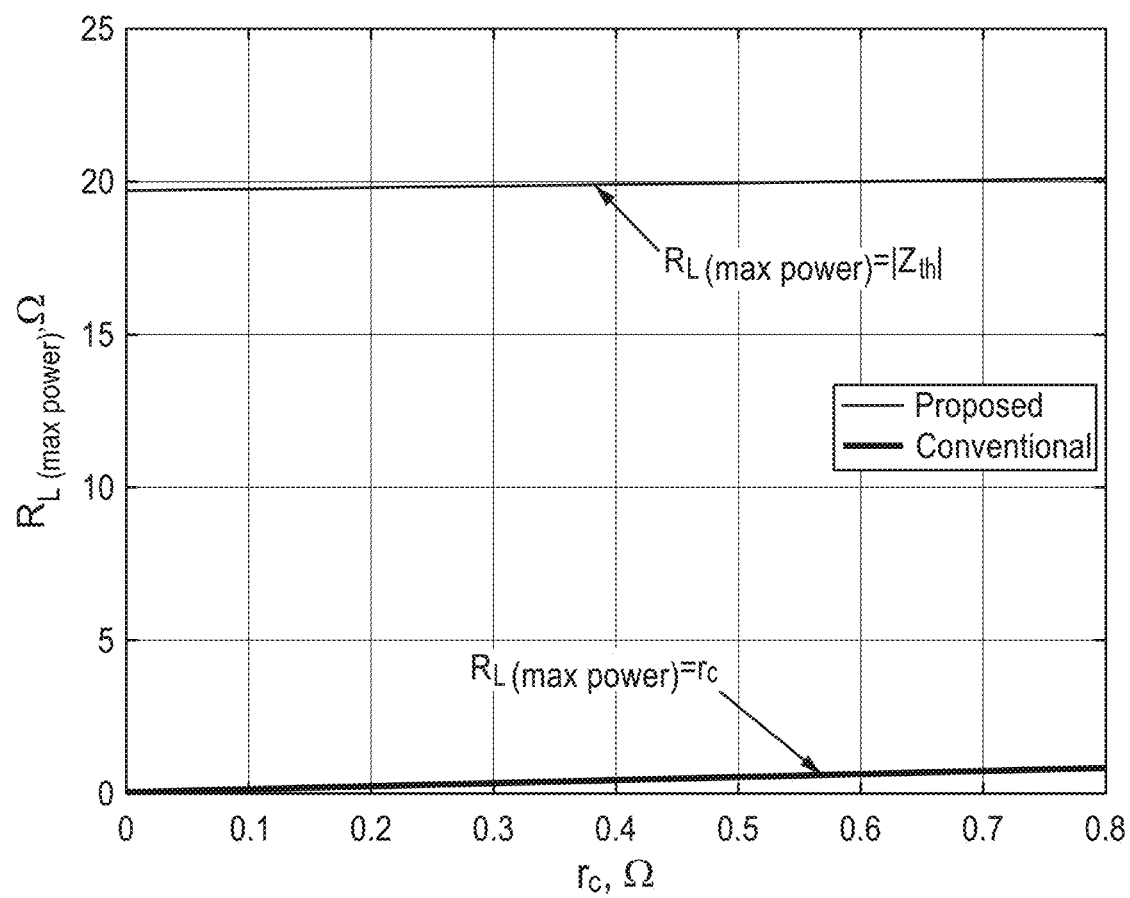
FIG. 9 illustrates a comparison of a variation of load resistance between the architecture according to certain embodiments and that of the conventional method.

FIG. 9 illustrates a comparison of a variation of load resistance between the architecture according to certain embodiments and that of the conventional method. In particular, FIG. 9 illustrates the variation of the value of load resistance at a maximum power condition versus $r_c$ in both the architecture according to certain embodiments, and the conventional method. Moreover, FIG. 9 illustrates that the conventional method is sensitive to the value of $r_c$, which is not the case in the architecture according to certain embodiments.

According to certain embodiments, it may be possible to provide lower voltage stresses for the involved passive elements (i.e., inductors and capacitors). For instance, in Table I below, a comparison between the conventional CPT and the CPT system of certain embodiments is shown for the aforementioned numerical example. In particular, the numbers in Table I show a significant reduction in voltage stresses across the passive elements of the CPT architecture of certain embodiments.

H-bridge inverter. In certain embodiments, the switching frequency may be limited to 36 kHz. However, in other embodiments, the switching frequency may be of other frequencies. In addition, for implementing the T-shaped inductive-capacitive compensator, an 8 µF inductor, two 1 µF capacitors, and 19 µH may be used. The 19 µH inductor may be used to compensate the 1 µF capacitor at 36 kHz, while the other 1 µF capacitor filters the high harmonics.

Figure 11:
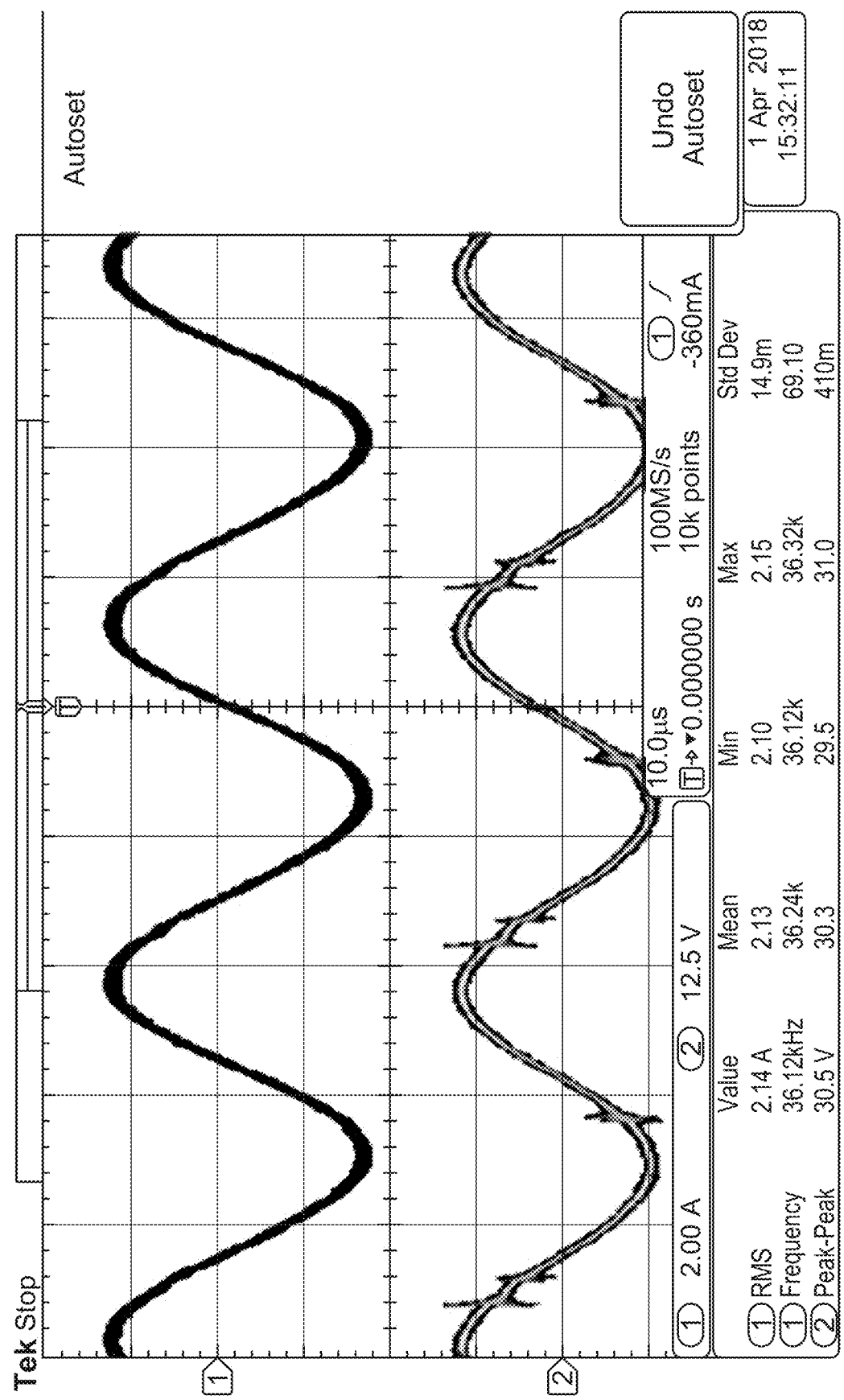
FIG. 11 illustrates the CPT system of FIG. 10 being tested at different load resistance, wherein the load voltage and the current is at 5Ω load according to certain embodiments.

According to certain embodiments, the system 100 may be tested at different load resistance. For instance, FIG. 11 illustrates the system being tested at different load resistance, wherein the load voltage and the current is at 5Ω load according to certain embodiments. As illustrated in FIG. 11, the load current is represented by the dark line at 2A/div, and the load voltage is represented by the light colored line at 12.5V/div—(10 µs/div). Based on these results, the calculated output power may be about 24.649 W. In other embodiments, different system parameters at different loads may be used to calculate the efficiency and gain. A sample of these parameters are presented in Table II below, which includes prototype parameters at different loads with gain and efficiency.

TABLE II prototype parameters at different loads with gain and efficiency

| R (Ω) | $V_{out}$ rms (V) | $I_{out}$ rms (A) | $P_{out}$ (W) | $V_{in}$ (V) | $I_{in}$ (A) | $P_{in}$ (W) | Gain | Efficiency % |
|---|---|---|---|---|---|---|---|---|
| 5  | 11.102 | 2.13  | 24.649 | 8.6 | 3.38 | 29.07 | 1.291 | 84.798 |
| 10 | 15.556 | 1.42  | 24.200 | 9.4 | 3.39 | 31.87 | 1.655 | 75.943 |
| 15 | 17.324 | 0.897 | 20.008 | 9   | 3.02 | 27.18 | 1.925 | 73.614 |
| 20 | 18.031 | 0.727 | 16.256 | 9   | 2.8  | 25.2  | 2.003 | 64.509 |
| 25 | 19.799 | 0.534 | 15.680 | 9   | 2.74 | 24.66 | 2.200 | 63.585 |
| 30 | 20.506 | 0.431 | 14.017 | 9   | 2.64 | 23.76 | 2.278 | 58.993 |
| 35 | 20.506 | 0.329 | 12.014 | 9   | 2.62 | 23.58 | 2.278 | 50.951 |
| 40 | 18.738 | 0.315 | 8.778  | 9   | 2.2  | 19.8  | 2.082 | 44.334 |

TABLE I

Voltage stresses of the passive elements in both methods

| | Conventional method | | | Proposed method | | | | | |
|---|---|---|---|---|---|---|---|---|---|
| Power level | Load Resistance | Voltage across $L_c$ | Voltage across $C_c$ | Load Resistance | Voltage across $L_c$ | Voltage across $C_c$ | Voltage across $L_x$ | Voltage across $C_x$ | Voltage across $L_1$ |
| 1200 W | 0.8 Ω | ~56 kV | ~56 kV | 225 Ω | ~3.5 kV | ~3.5 kV | 100 V | ~800 V | ~650 V |
| 4500 W | — | — | — | 20 Ω | ~23 kV | ~23 kV | ~60 V | ~500 V | ~420 V |

Figure 10:
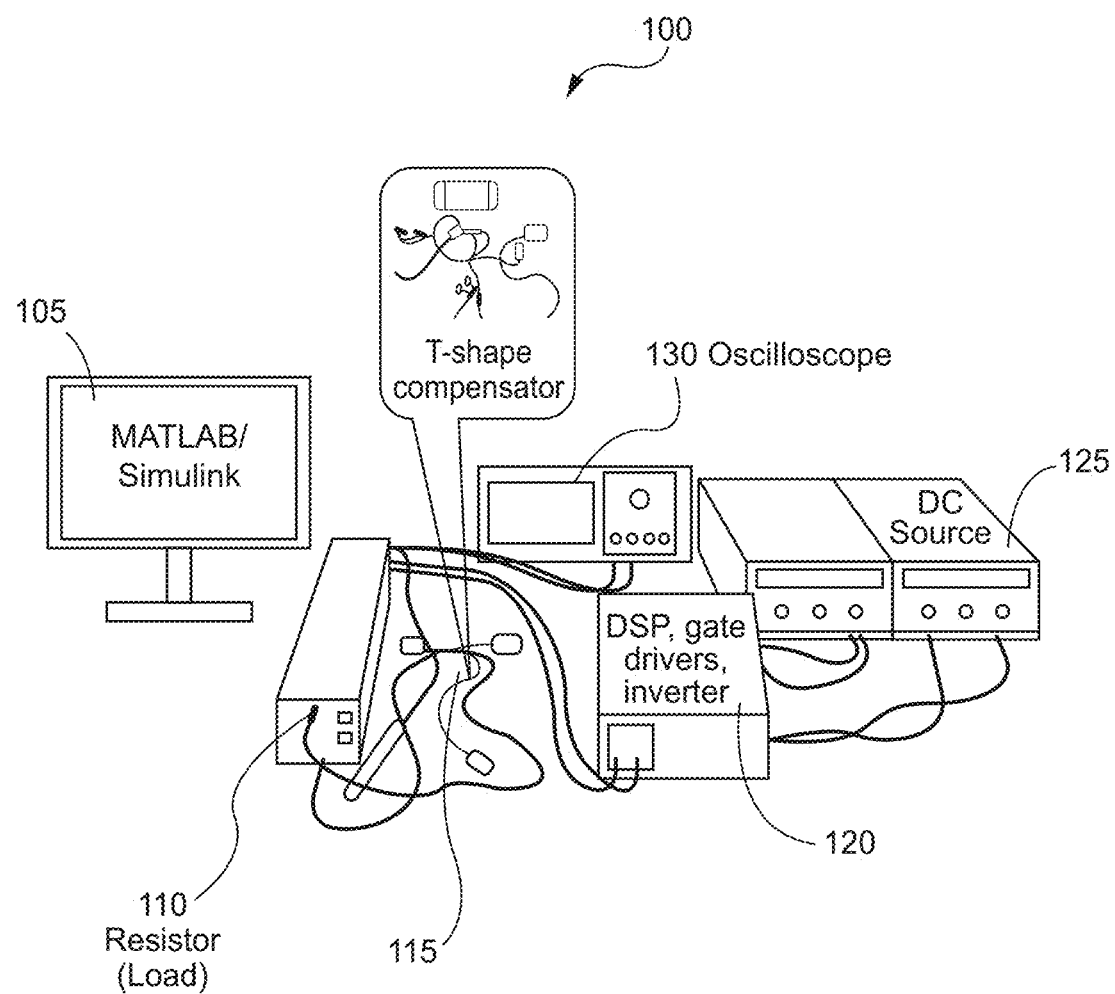
FIG. 10 illustrates a CPT system according to certain embodiments.

FIG. 10 illustrates a CPT system 100 according to certain embodiments. As illustrated in FIG. 10, the CPT system may include client computer 105 that may be configured to implement testing software for the system. Such software may include, but not limited to, for example, MATLAB Simulink. The system 100 may also include a resistor (load) component 110, which may be electrically connected to a T-shape compensator 115. In addition, the system 100 may include a digital signal processing (DSP) device, gate drivers, and/or inverter 120, and a direct current (DC) source 125. Further, the system may include an oscilloscope 130 for monitoring and observing varying signal voltages.

FIG. 10 also illustrates the different elements of the system 100, wherein each element may be separately tested before testing the overall system. The ezdsp TMS320F28335 DSP board may be employed to control the gate drive circuits that drive the SiC MOSFET-based TABLE II-continued prototype parameters at different loads with gain and efficiency

| R (Ω) | $V_{out}$ rms (V) | $I_{out}$ rms (A) | $P_{out}$ (W) | $V_{in}$ (V) | $I_{in}$ (A) | $P_{in}$ (W) | Gain | Efficiency % |
|---|---|---|---|---|---|---|---|---|
| 45  | 19.445 | 0.281  | 8.403 | 9 | 2.13 | 19.17 | 2.161 | 43.833 |
| 50  | 18.738 | 0.248  | 7.023 | 9 | 2.15 | 19.35 | 2.082 | 36.292 |
| 150 | 20.153 | 0.0667 | 2.708 | 9 | 2.06 | 18.54 | 2.239 | 14.604 |

As shown in Table II, the values indicate that the T-shape inductive-capacitive compensator participates in transferring high power in a CPT system. This can be seen from the gain values, as all the values are greater than 1 In addition, the maximum power among the load resistance range used is at 5Ω as it reaches almost 25 W. Further, the maximum efficiency (84.8%) is also achieved at 5Ω.

Figure 12:
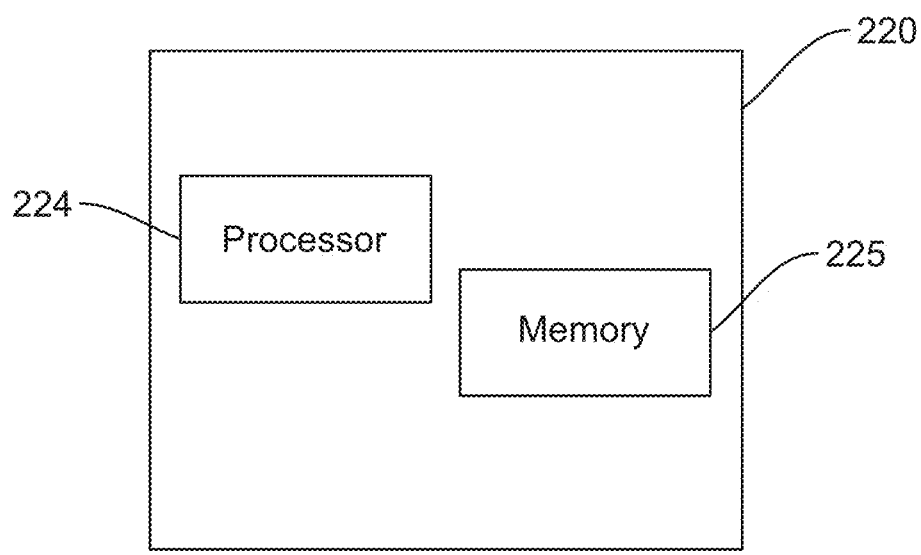
FIG. 12 illustrates an electronic component of a system according to certain embodiments.

FIG. 12 illustrates an electronic component 220 of a system according to certain embodiments. In certain embodiments, the system may be an electronic system such as the CPT system illustrated in FIG. 10, which includes a T-shape compensator. In an embodiment, the component 220 may be configured to control and/or operate various circuits and/or components of the system, including, for example a T-shape inductive-capacitive network for CPT applications as described herein. The component 220 may also be configured to control and/or operate the various components of the CPT system illustrated in FIG. 10.

It should be understood that each block of FIGS. 3 and 6-12, or any combination thereof, may be implemented by various means or their combinations, such as hardware, software, firmware, one or more processors and/or circuitry. In one embodiment, more than one component 220 may be included, although only one component 220 is shown for the purposes of illustration. While the systems, methods, and apparatus are described in the foregoing context, acts and operations described hereinafter may also be implemented in hardware.

The component 220 may include at least one processor 224 for processing information and executing instructions or operation. Processor 224 may be any type of general or specific purpose processors. While a single processor 224 is shown for the component 220 in FIG. 12, multiple processors may be utilized in each device according to other embodiments. In fact, processor 224 may include one or more general-purpose computers, special purpose computers, microprocessors, central processing units (CPU), digital signal processors (DSPs), field-programmable gate arrays (FPGAs), application-specific integrated circuits (ASICs), and processors based on a multi-core processor architecture, as examples, or other comparable devices. The processor 224 can be implemented as a single controller, or a plurality of controllers or processors.

At least one memory (internal or external) can be provided in each device, and indicated as 225. The memory may include computer program instructions or computer code contained therein. The processor 224 and memory 225, or a subset thereof, can be configured to provide means corresponding to the various blocks and processes shown in FIGS. 3 and 6-12.

Memory 225 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer instructions can be configured, with the processor for each device, to cause a hardware apparatus such as component 220 to perform any of the processes described herein (see, for example, FIGS. 3 and 6-12). Therefore, in certain embodiments, a non-transitory computer-readable medium can be encoded with computer instructions that, when executed in hardware, perform a process such as any one of the processes described herein. Accordingly, in certain embodiments, a non-transitory computer-readable medium can be encoded with computer instructions that, when executed in hardware, perform any of the processes described herein. Alternatively, certain embodiments of the invention can be performed entirely in hardware.

According to certain embodiments therefore, it may be possible to provide and/or achieve various advantageous effects and improvements in computer-related technology. For instance, according to certain embodiments, it may be possible to provide an inductive-capacitive network for CPT that provides operations with boosted load voltage, lower voltage stresses of the passive network, and enhanced power capability with a moderate range of frequency (f). It may also be possible to minimize the effect of inductor ESR to the point where it such effect is insignificant on the value of load resistance at maximum power condition. According to certain embodiments, this results in the ability to transfer high power levels, including, for example, enhanced power capability when compared with conventional methods.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A capacitive power transfer system, comprising:
an inductive-capacitive circuit;
a direct current power source;
a power inverter configured to receive direct current supplied from the direct current power source, change the direct current to an alternating current, and supply the alternating current to the inductive-capacitive circuit;
a resistor load component electrically coupled to the inductive-capacitive circuit;
a signal monitoring device configured to monitor signal voltages in the inductive-capacitive circuit; and
a client computing device configured to implement a program to drive the system,
wherein the inductive-capacitive circuit comprises
a first branch including a first energy storage element,
a second branch including a second energy storage element and a third energy storage element, and
a third branch including a fourth energy storage element and a fifth energy storage element, and
wherein the first branch, the second branch, and the third branch are connected to at least one common node of the inductive-capacitive circuit,
wherein the first energy storage element is a first inductor,
wherein the second energy storage element is a second inductor,
wherein the third energy storage element is a first capacitor,
wherein the fourth energy storage element is a third inductor, and
wherein the fifth energy storage element is a second capacitor.

2. The capacitive power transfer system of claim 1, wherein
the fourth and fifth energy storage elements of the third branch are connected in parallel with the second and third energy storage elements of the second branch, and the first energy storage element of the first branch is connected in series with the parallel combination of the fourth and fifth energy storage elements and the second and third energy storage elements.

3. The capacitive power transfer system of claim 1, wherein the third branch comprises a load, the load including a load resistance, and
wherein the load resistance is in a range of about 0.4Ω to about 2,500Ω.

4. The capacitive power transfer system of claim 1, wherein the second branch is tuned to a third harmonic frequency.

5. The capacitive power transfer system of claim 4, wherein an inductance value of the first energy storage element is selected to achieve a gain of zero after the third harmonic frequency.

6. A computer program, embodied on a non-transitory computer readable medium, the computer program, when executed by a processor, causes the processor to:
drive a system that includes an inductive-capacitive circuit;
supply a direct current to a power inverter;
change the direct current to an alternating current;
supply the alternating current to the inductive-capacitive circuit; and
monitor signal voltages in the inductive-capacitive circuit,
wherein the inductive-capacitive circuit comprises
a first branch including a first energy storage element,
a second branch including a second energy storage element and a third energy storage element,
a third branch including a fourth energy storage element and a fifth energy storage element, and
a power source supplying a current through the first branch, the second branch, and the third branch, and
wherein the first branch, the second branch, and the third branch are connected to at least one common node of the inductive-capacitive circuit,
wherein the first energy storage element is a first inductor,
wherein the second energy storage element is a second inductor,
wherein the third energy storage element is a first capacitor,
wherein the fourth energy storage element is a third inductor, and
wherein the fifth energy storage element is a second capacitor.

7. The computer program of claim 6, wherein
the fourth and fifth energy storage elements of the third branch are connected in parallel with the second and third energy storage elements of the second branch, and
the first energy storage element of the first branch is connected in series with the parallel combination of the fourth and fifth energy storage elements and the second and third energy storage elements.

8. The computer program circuit of claim 6, wherein the third branch comprises a load, the load including a load resistance, and
wherein the load resistance is in a range of about 0.4Ω to about 2,500Ω.

9. The computer program of claim 6, wherein the second branch is tuned to a third harmonic frequency.

\* \* \* \* \*